(12) United States Patent
Aberg et al.

(10) Patent No.: US 12,441,582 B2
(45) Date of Patent: Oct. 14, 2025

(54) ELEVATOR SYSTEM, MOBILE ROBOT, AND METHOD FOR GENERATING ELEVATOR CONTROL SIGNAL USING THE MOBILE ROBOT

(71) Applicant: Kone Corporation, Helsinki (FI)

(72) Inventors: Janne Aberg, Helsinki (FI); Niko Elomaa, Helsinki (FI); Jukka Salmikuukka, Helsinki (FI)

(73) Assignee: Kone Corporation, Helsinki (FI)

( * ) Notice: Subject to any disclaimer, the term of this patent is extended or adjusted under 35 U.S.C. 154(b) by 1598 days.

(21) Appl. No.: 16/790,200

(22) Filed: Feb. 13, 2020

(65) Prior Publication Data
US 2020/0180903 A1    Jun. 11, 2020

Related U.S. Application Data

(63) Continuation of application No. PCT/EP2018/072096, filed on Aug. 15, 2018.

(30) Foreign Application Priority Data

Aug. 30, 2017 (EP) .................... 17188490

(51) Int. Cl.
    *B66B 1/34*      (2006.01)
    *B66B 1/46*      (2006.01)
    *G05D 1/00*      (2006.01)

(52) U.S. Cl.
    CPC ............ *B66B 1/3461* (2013.01); *B66B 1/468* (2013.01); *G05D 1/0285* (2013.01);
(Continued)

(58) Field of Classification Search
    CPC ........... B66B 1/34–3415; B66B 1/3446–3476; B66B 1/3492; B66B 1/46; B66B 1/468;
(Continued)

(56) References Cited

U.S. PATENT DOCUMENTS 7,694,781 B2 * 4/2010 Sorsa .................... B66B 1/2458
                                                    187/382
8,958,910 B2 * 2/2015 Ichinose ............... B66B 1/2458
                                                    700/258
(Continued)

FOREIGN PATENT DOCUMENTS

| JP | 2008-162758 A | 7/2008 |
|---|---|---|
| JP | 5572018 B2 | 8/2014 |

OTHER PUBLICATIONS

International Search Report PCT/ISA/210 for International Application No. PCT/EP2018/072096 Dated Nov. 19, 2018.
(Continued)

*Primary Examiner* — Christopher Uhlir
(74) *Attorney, Agent, or Firm* — Harness, Dickey & Pierce, P.L.C.

(57) ABSTRACT

The invention relates to a method for controlling an elevator. In the method at least one control signal is generated for instructing the at least one mobile robot to a predetermined position. The at least one mobile robot generates at least one control signal to the elevator controller for controlling an elevator in response to an interaction with at least one user in the predetermined position. The invention also relates to an elevator system and a mobile robot implementing at least portions of the method.

19 Claims, 4 Drawing Sheets

(52) U.S. Cl.
CPC ... *B66B 2201/101* (2013.01); *B66B 2201/402* (2013.01); *B66B 2201/403* (2013.01); *B66B 2201/4638* (2013.01); *B66B 2201/4653* (2013.01)

(58) Field of Classification Search
CPC .. B66B 2201/00–103; B66B 2201/402; B66B 2201/403; B66B 2201/4607–4638; B66B 2201/4653
See application file for complete search history.

(56) References Cited

U.S. PATENT DOCUMENTS

| | | | |
|---|---|---|---|
| 11,420,844 B2* | 8/2022 | Kuroda | B66B 17/20 |
| 11,897,727 B2* | 2/2024 | Koba | B66B 1/3492 |
| 2008/0264731 A1 | 10/2008 | Mangini et al. | |
| 2009/0057068 A1 | 3/2009 | Lin et al. | |
| 2014/0122018 A1* | 5/2014 | Sundholm | B66B 5/0012 |
| | | | 187/388 |
| 2017/0225321 A1 | 8/2017 | Deyle et al. | |

OTHER PUBLICATIONS

Written Opinion of the International Searching Authority PCT/ISA/237 for International Application No. PCT/EP2018/072096 Dated Nov. 19, 2018.
Notice of Opposition dated Jan. 20, 2022, issued in corresponding European Patent Application No. 17188490.1.

* cited by examiner

ELEVATOR SYSTEM, MOBILE ROBOT, AND METHOD FOR GENERATING ELEVATOR CONTROL SIGNAL USING THE MOBILE ROBOT

CROSS-REFERENCE TO RELATED APPLICATION

This application is a continuation of PCT International Application No. PCT/EP2018/072096 which has an International filing date of Aug. 15, 2018, and which claims priority to European patent application number 17188490.1 filed Aug. 30, 2017, the entire contents of both of which are incorporated herein by reference.

TECHNICAL FIELD

The invention concerns in general the technical field of elevators. More particularly, the invention concerns elevator system comprising one or more mobile robots.

BACKGROUND

One area of development in elevator systems is solutions for improving user experience. For example, one issue causing frustration to users of the elevator systems is a waiting time of an elevator. There are developed solutions for improving user experience in this regard.

Traditionally, an elevator is called to a floor by using a user interface typically arranged in the doorway of the elevator. In other words, when a user enters a building and walks to the elevator he presses a button for calling the elevator on the floor. It is straightforward to understand that almost always this kind of implementation for generating elevator calls causes a waiting of the elevator. Only if the elevator resides in the floor from which the elevator call is generated the waiting time for the user is minor—only the time it takes to open elevator doors.

A slightly more sophisticated solutions are such that the elevator call giving devices are arranged distant from the elevator itself, e.g. on a doorway of a building for example. Now, the user may make the elevator call when entering the building, and this gives the elevator system some time to arrange the elevator on the floor when the user walks to the elevator. Still more sophisticated solutions are such that a mobile phone or similar is used for generating the elevator call to the elevator system. This enables the user to select optimal timing for him/her for calling the elevator.

Also the more sophisticated solutions have drawbacks. Namely, when the elevator call giving devices are arranged distantly from the elevator the user still needs to reach the call giving device and this may require extra walk to the user. In case the mobile phone or similar is used for call giving the utilization of them is personal and the user may need to install applications in the terminal device in order to use the system. Moreover, this may require some configuration of the terminal device in order to make the application to work properly. Additionally, the user may need to establish a connection with his/her terminal device to the elevator system, which may turn out to be cumbersome, especially in a hurry. Naturally, the above described drawbacks also apply, at least in party, to other type of elevator control signals than elevator call, such as door opening and/or closing.

Hence, there is need to develop further solutions in order to improve the user experience with the elevator systems.

SUMMARY

The following presents a simplified summary in order to provide basic understanding of some aspects of various invention embodiments. The summary is not an extensive overview of the invention. It is neither intended to identify key or critical elements of the invention nor to delineate the scope of the invention. The following summary merely presents some concepts of the invention in a simplified form as a prelude to a more detailed description of exemplifying embodiments of the invention.

An objective of the invention is to present an elevator system, a mobile robot and a method for generating an elevator control signal. Another objective of the invention is that the elevator system, the mobile robot and the method for generating the elevator control signal make a use of elevator more comfortable.

The objectives of the invention are reached by an elevator system, a mobile robot and a method as defined by the respective independent claims.

According to a first aspect, an elevator system is provided, the elevator system comprising: an elevator controller, and at least one mobile robot; wherein the at least one mobile robot is configured to generate at least one control signal for instructing the at least one mobile robot to a predetermined position, and wherein the at least one mobile robot is configured to generate at least one control signal to the elevator controller for controlling an elevator in response to an interaction with at least one user in the predetermined position.

The mobile robot may comprise a user interface for interacting with the at least one user.

The system may further comprise a data center wherein the data center is configured to generate a signal to the at least one mobile robot for generating the at least one control signal for instructing the at least one mobile robot to the predetermined position based on at least one of the following: real-time data obtained in a vicinity of the elevator, statistical data generated from data gathered in a vicinity of the elevator, data defining a predetermined rule for determining the predetermined position based on time. Further, the obtained real-time data may represent user traffic within the vicinity of the elevator. The elevator system may further comprise a sensor system for obtaining the real-time data representing the user traffic.

Alternatively or in addition, the data center may be configured to generate the statistical data from data gathered in the vicinity of the elevator. The statistical data may represent user traffic over a period of time in the vicinity of the elevator.

Moreover, the at least one control signal generated by the data center may be transmitted to the at least one mobile robot by one of the following: the data center, through the elevator controller.

The data center may further be configured to initiate a timer, in response to a generation of the at least one control signal to the at least one mobile robot for instructing the at least one mobile robot to a predetermined position, for reserving the at least one mobile robot to serve for the duration of the timer. The data center may be configured to, in response to detection that no interaction is performed between the mobile robot and the user during the duration of the timer, generate a release signal to the mobile robot for releasing the mobile robot.

Still further, the elevator system may further comprise a computing device wherein the computing device is configured to generate a signal to the at least one mobile robot for generating the at least one control signal for instructing the at least one mobile robot to the predetermined position based on at least one of the following: real-time data obtained in a vicinity of the elevator, statistical data generated from data gathered in a vicinity of the elevator, data defining a predetermined rule for determining the predetermined position based on time. The computing device may be at least one of the following: an elevator controller, a dedicated device, at least one mobile robot.

The control signal generated by the at least one mobile robot to the elevator controller may be at least one of the following: an elevator call, an elevator door control signal, a control signal for setting the elevator to a predetermined operational state.

According to a second aspect, a mobile robot for generating an elevator control signal is provided, the mobile robot comprising: at least one processor; at least one memory including computer program code; the at least one memory and the computer program code configured to, with the at least one processor, cause the mobile robot to perform: generate at least one control signal for instructing to move to a predetermined position, and generate at least one control signal to the elevator controller for controlling an elevator in response to an interaction with at least one user in the predetermined position.

According to a third aspect, a method for generating an elevator control signal is provided, the method comprises: generating, by at least one the mobile robot, at least one control signal for instructing the at least one mobile robot to a predetermined position, and generating, by the at least one mobile robot, at least one control signal to the elevator controller for controlling an elevator in response to an interaction with at least one user in the predetermined position.

The generation of the at least one control signal may be performed in response to a receipt of signal from one of the following: a data center, a computing device.

Furthermore, the method may further comprise: initiating a timer in the data center, in response to a generation of the at least one control signal to the at least one mobile robot for instructing the at least one mobile robot to a predetermined position, for reserving the at least one mobile robot to serve for the duration of the timer.

The method may further comprise: generating by the data center, in response to detection that no interaction is performed between the mobile robot and the user during the duration of the timer, a release signal to the mobile robot (150) for releasing the mobile robot (150).

The generation of the at least one control signal for instructing the at least one mobile robot to the predetermined position may be based on at least one of the following: real-time data obtained in a vicinity of the elevator, statistical data generated from data gathered in a vicinity of the elevator, data defining a predetermined rule for determining the predetermined position based on time.

The expression "a number of" refers herein to any positive integer starting from one, e.g. to one, two, or three.

The expression "a plurality of" refers herein to any positive integer starting from two, e.g. to two, three, or four.

Various exemplifying and non-limiting embodiments of the invention both as to constructions and to methods of operation, together with additional objects and advantages thereof, will be best understood from the following description of specific exemplifying and non-limiting embodiments when read in connection with the accompanying drawings.

The verbs "to comprise" and "to include" are used in this document as open limitations that neither exclude nor require the existence of unrecited features. The features recited in dependent claims are mutually freely combinable unless otherwise explicitly stated. Furthermore, it is to be understood that the use of "a" or "an", i.e. a singular form, throughout this document does not exclude a plurality.

BRIEF DESCRIPTION OF FIGURES

The embodiments of the invention are illustrated by way of example, and not by way of limitation, in the figures of the accompanying drawings.

DESCRIPTION OF THE EXEMPLIFYING EMBODIMENTS

The specific examples provided in the description given below should not be construed as limiting the scope and/or the applicability of the appended claims. Lists and groups of examples provided in the description given below are not exhaustive unless otherwise explicitly stated.

The present relates at least in part to an elevator system comprising devices and entities of an elevator residing in a location where an elevator is operated. Additionally, the elevator system according to the present invention comprises a mobile robot configured to communicate with one or more other entities belonging to the elevator system. Furthermore, the elevator system may comprise a data center configured to communicate with one or more other entities belonging to the elevator system.

Figure 1:
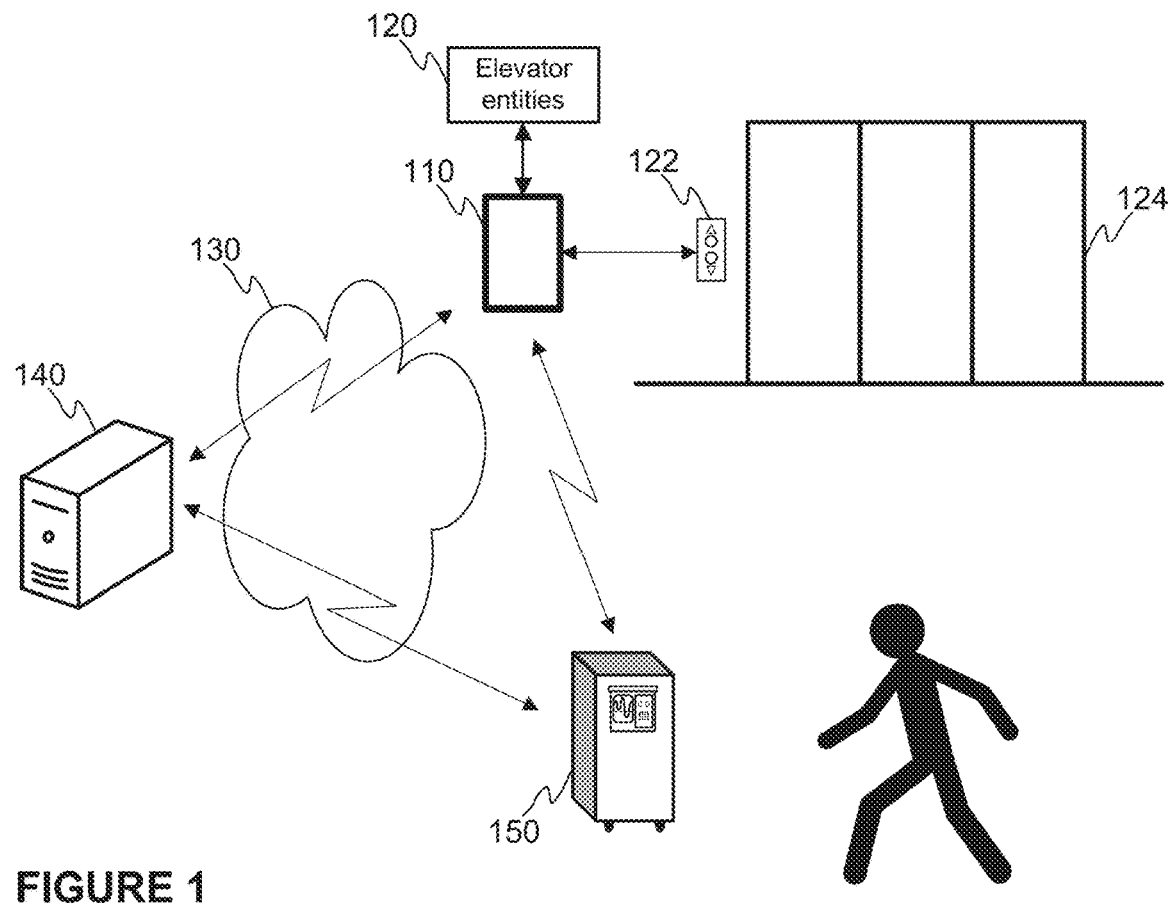
FIG. 1 schematically illustrates some aspects of an embodiment of the invention.

FIG. 1 schematically illustrates at least some aspects of an embodiment of the invention wherein an elevator environment comprises one or more elevators residing in a location, such as in a building or in a ship. The elevator comprises an elevator controller 110, which is configured to control elevator entities 120 installed in the location. For example, the entities 120 may comprise, but are not limited to, drive circuit and devices, safety circuit and devices, sensors, elevator call devices 122 and elevator door 124 circuits and devices, elevator cabin and similar. The entities are at least communicatively coupled to each other either directly or indirectly e.g. through the elevator controller 110, which operates as a master device for the elevator. The elevator may be communicatively coupled, e.g. from the elevator controller 110, to a data center 140. The data center 140 may refer to a stand-alone server or to a plurality of servers providing distributed computing resource in the elevator system. For example, the data center 140 may perform monitoring function of the elevator system, but also to obtain information from other resources, such as from one or more sensors arranged in the location of the elevator or in any other location. The elevator controller 110 and the data center 140 may be communicatively coupled to each other e.g. over a communication network 130. The communication network may implement a wired or a wireless communication technology. The communication network 130 may e.g. be a mobile communication network. The elevator controller 110 comprises a communication interface, such a modem implementing the communication technology in use, towards the communication network 130. Similarly, the data center is configured accordingly to communicate through the communication network 130. The elevator system further comprises at least one mobile robot 150. The term mobile robot 150 shall in this context be understood as a machine capable of carrying out actions automatically in response to an input provided to the robot. Moreover, in this context the robot comprises means for enabling it to be mobile within the area it operates, such as the location of the elevator. The means for enabling the mobility may refer to power generating means, such as an electric motor receiving its power from a battery located in the robot. Additionally, the mobile robot 150 comprises means of transport, such as a drive shaft and a number of tyres, or similar, into which the power is brought from the electric motor. The means for enabling the mobility as described above is a non-limiting example and any means by means of which the robot may be mobile may be applied to. Moreover, the mobile robot 150 may comprise computing resources for controlling an operation of the robot. At least part of the controlling may be received from an external control device, which in the context of the present invention may refer to the elevator controller 110 or the data center 140, or even a combination of these, or to some other entity, which is configured to generate and transmit control signals to the mobile robot 150. Moreover, the mobile robot 150 may comprise a communication interface through which the mobile robot may be communicatively coupled to the data center 140 or to the elevator controller 110 or both. According to some embodiment the mobile robot 150 may be configured to communicate with the data center 140 through the elevator controller 110. The communication between the mobile robot 150 and the mentioned entities i.e. the data center 140 and/or the elevator controller 110 may e.g. be arranged through the communication network 130. Alternatively or in addition, the mobile robot 150 may be configured to communicate with at least one of the mentioned entities locally e.g. over a short range wireless communication technology. For example, the mobile robot 150 and the elevator controller 110 may be coupled to a local Wi-Fi network and the communication may be arranged over it. According to still further embodiment a dedicated communication channel may be arranged between the mobile robot 150 and the elevator controller 110. The mobile robot 150 may also be equipped with a number of sensors. The sensors may e.g. obtain information on the environment. An example of the sensors may e.g. be sensors obtaining position information broadcast e.g. from an applicable positioning system, such as from an indoor positioning system. The positioning of the mobile robot 150 may also be based on a transmitter arranged in the robot, which transmitter is configured to transmit a signal detected by one or more receivers arranged in the area and on the basis of the detected signal the position of the mobile robot 150 may be derived. Still further, the mobile robot 150 may comprise a user interface e.g. comprising I/O devices, such as buttons, keyboard, touch screen, microphone, loudspeaker, display and so on, for receiving input and outputting information. The I/O devices may also refer to sensors mentioned earlier. For giving an example of the input given to a robot may e.g. be an indication on a need to use the elevator, i.e. giving an elevator call through the mobile robot 150, which indication may be signaled from the robot 150 to the elevator controller 110. Alternatively or in addition, the input given to a robot may indicate another type of control request towards the elevator, such as requesting to control the door of the elevator (e.g. to open or to close).

Figure 2:
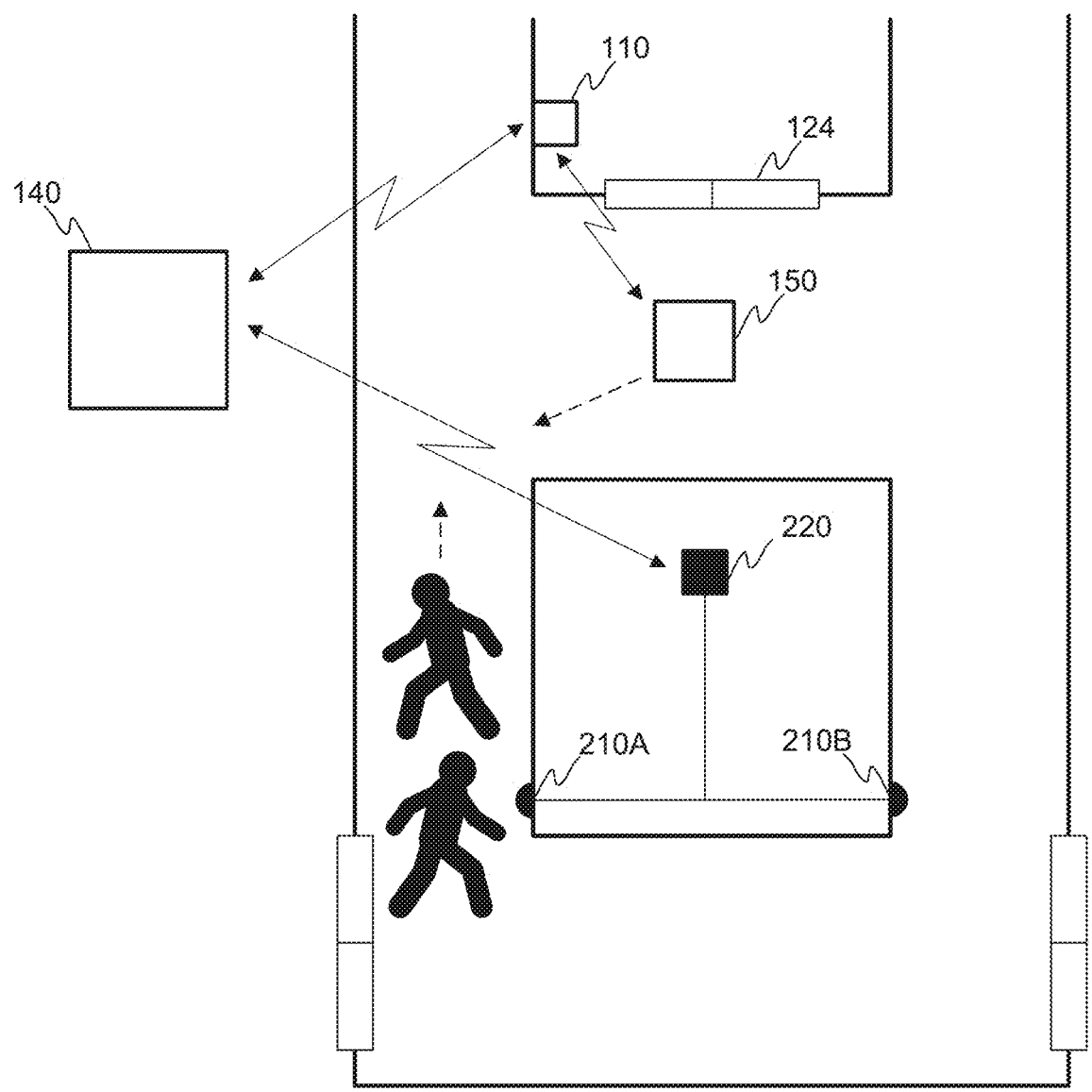
FIG. 2 schematically illustrates some further aspects of an embodiment of the present invention.

Next some aspects of the present invention are introduced by referring to FIG. 2 illustrating an example of an environment in which the invention may be applied to. Here, at least some aspects of the invention are described in a context in which a passenger wants to use the elevator and he/she generates an elevator call in a predetermined manner. However, the present invention is not only limited to a generation of the elevator call signal, but any other control signal for controlling the elevator may also be generated, such as a signal for controlling one or more elevator doors. Moreover, the generated signal may carry information causing a plurality of operations in the elevator, such as generating an elevator call as well as a control signal for the elevator doors. As a starting point for describing the invention as schematically illustrated in FIG. 2 the building comprises an elevator arranged to carry passengers from one floor to another. In FIG. 2 the elevator doors 124 are illustrated for indicating the location of the elevator in FIG. 2. The elevator is controlled by the elevator controller 110. In the embodiment the elevator controller is communicatively coupled to a data center 140. Moreover, there is arranged a sensor system in the building comprising a plurality of sensors 210A, 210B and a sensor controller 220, which may be configured to transmit obtained sensor information in a form of sensor data to the data center 140. The sensors 210A, 210B may e.g. be infrared sensors configured to detect motion originating e.g. from persons roaming in the building. Additionally, there is arranged at least one mobile robot 150 in the building. In the embodiment the data center 140 receives sensor data either in a raw form or processed by the sensor controller 220 in a predetermined manner. The communication between the data center 140 and the sensor controller 220 may be arranged with any known wireless communication method. The data center 140 may be configured to generate a control signal for the mobile robot 150 at least in part on a basis of the data obtained from the sensor system. In other words, the sensor system may provide information on the persons roaming in the building and the data center 140 may process the data and based on that to generate a signal to the elevator controller 110. The generated signal may carry information to the mobile robot 150. The information may e.g. be an instruction to move the mobile robot 150 towards a certain location and possibly instruction to set the mobile robot 150 to a predetermined mode, such as e.g. prepared to receive input from at least one person. Hence, the data center 140 may be configured, e.g. through a programming, to process the information received from the sensor system so that an understanding on persons and possibly their motion and/or position in the building may be generated. For this purpose the data center 140 may e.g. store information on a lay-out of the building. Through the processing of information the data center may e.g. generate information on a position into which the mobile robot 150 shall be instructed in order to serve the at least one person. The generated information may express either directly or indirectly the position. In case the generated information expresses the position indirectly the elevator controller 110 may generate the position for the mobile robot 150 on the basis of the information received from the data center 140. In any described case the elevator controller 110 generates a control signal to the mobile robot 150, which interprets the content of the control signal and may generate necessary control signals internally for generating the motion power in order to move the mobile robot 150 into the position as instructed. In response to this the mobile robot 150 may be moved to a position for serving the at least one person roaming in the building. For example, the mobile robot 150 may be moved towards the person. When the person or persons enter close to the mobile robot 150 the mobile robot 150 may be configured to prompt the person to indicate a need for an elevator. The prompting may be arranged with a voice prompt or with a prompt displayed on the display of the user interface or any similar prompting mechanism. In response to the prompting at least one of the persons may indicate e.g. through a predetermined action performed with the user interface of the mobile robot 150 that an elevator is needed. The mobile robot 150 generates, in response to a receipt of the indication, a signal to the elevator controller 110, which in turn may generate an elevator call.

The embodiment described above is based on an idea that the mobile robot 150 receives its instructions, or control signal, from the elevator controller 110. In another embodiment the data center 140 may generate the instruction to the mobile robot 150 and transmit it directly to the mobile robot 150. In this kind of implementation of the invention the elevator controller 110 is not involved in the instructing the mobile robot 150 to the determined position for reaching the one or more persons. When the mobile robot 150 receives the indication on the need of an elevator, it may be arranged that the mobile robot 150 generates the signal to the data center 140 for providing information on the indication of the need for the elevator. The data center 140 may be configured to transmit the information to the elevator controller 110 for generating the elevator call, or any other type of control signal, as explained. Alternatively, the mobile robot 150 may be directly communicatively coupled to the elevator controller 110 and, hence, the mobile robot 150 may generate the signal, in response to receipt of such input from the at least one person, for indicating the need for the elevator directly to the elevator controller 110.

In the embodiment described above the control signal generated for the mobile robot 150 is based on a measurement data representing real-time information on occurrences with the location, such as in a building, of the robot. The real-time information may be obtained with a sensor system, as described. According to another embodiment the data center may be provided with statistical information on user traffic in the location. The statistical information may be generated on a basis of data gathered within the location during a period of time. For example, the data may be gathered with any sensor system, or even manually, i.e. by any manner as long as statistical information may be generated. According to an embodiment the statistical information is generated in a time based manner. In other words, the statistical information represents user traffic in a time based manner. This kind of data advantageously provides information where are the user traffic flows at a certain time, or period of time, within the location in question. By means of this kind of information the data center 140 may generate control signal either directly to the mobile robot 150 or indirectly e.g. through the elevator controller 110 to the mobile robot 150 for instructing the mobile robot 150, or a plurality of mobile robots 150, to move to predetermined position in the location for serving the users as described.

Some aspects of the invention may relate to an even more sophisticated embodiment in which the data center 140 may be configured to determine, based on at least one predetermined criterion, at least one time frame during which the mobile robot 150 in question is reserved to serve a certain user. In other words, as the mobile robot 150 may be instructed to some location through the mechanism as described above it may happen that the user who triggered the moving of the mobile robot 150 may not need the elevator at all and, hence, does not interact with the mobile robot 150 at all. In order to release the robot from serving the user in question it may be arranged that the mobile robot 150 is provided, e.g. in the instruction message to move, also the time frame information indicating a period of time it is reserved for serving the user in question. If no interaction is received from the user during the time frame, the mobile robot may release itself from serving the user. This may e.g. cause the mobile robot 150 to return to a predetermined location, such as waiting area, and waiting for a next instruction message. Alternatively, the data center 140, or even the elevator controller 110, may be configured to, e.g. in response of transmitting the instruction message towards the mobile robot 150 either directly or indirectly, initiate a timer for indicating the time frame the mobile robot 150 is reserved for performing the task in question, i.e. serving the user. The time parameter for the timer may be determined based on the task the mobile robot 150 is instructed to perform, e.g. based on known durations to perform the task in question, or there may be a default value for all tasks. In response to a lapse of the timer, and to a detection that the mobile robot 150 has not received a predetermined input from the user, e.g. no elevator call is generated to the elevator system, the data center 140, or the elevator controller 110, may be configured to generate a release signal to the mobile robot 150 for indicating that it is released from the task previously instructed. In the described manner the elevator system according to the embodiment may operate more efficiently and the number of mobile robots 150 needed to operate in a certain area may be optimized.

In some further embodiment the mobile robot 150 may be configured to guide the user to an elevator, or even to a final destination, in response to an interaction with the user. For example, it may be arranged that the user indicates to the mobile robot 150 a person or a location, such as an office or similar, who he intends to meet or where the user is going to. The mobile robot 150 may determine either internally, or externally by communicating e.g. with the data center, instructions to reach the destination and as an outcome of the determination the mobile robot 150 may generate an elevator call signal, which may e.g. indicate the elevator the user needs for reaching the destination as well as an indication that the mobile robot 150 intends to access the elevator car with the user. The provision of these pieces of information may cause adjustment of the operation of the elevator system. For example, the elevator doors may be maintained open longer than in at least one other situation, because an entering of the mobile robot may require a longer loading time than in some other situation. Moreover, the indication may cause the elevator system to adjust its operation further.

At least some aspects of the present invention are described above in an environment in which the data center 150, implemented as a stand-alone device or in a distributed computing solution, performs operations for achieving a result of the invention. However, as mentioned earlier at least part of the controlling may be performed with combined operation of the described entities, or some other entity may be configured to perform at least some of the operations. The other entity may refer to a computing device configured to generate, either directly or indirectly, at least one control signal to the mobile robot for instructing the at least one mobile robot 150 to a predetermined position. The computing device may e.g. receive a real-time data or a statistical data or process and generate it, for utilizing it in a generation of at least one control signal to at least one mobile robot 150 as described. The computing device may e.g. be communicatively coupled to at least one sensor for obtaining data for processing and analyzing. Moreover, the computing device may comprise the timer as discussed above in the context of the data center. The computing device may e.g. be the elevator controller 110 or any dedicated locally or remotely arranged device, such as a server device, configured to perform the task. The implementation of the computing device may be done as a stand-alone device or as a distributed computing environment between a plurality of stand-alone devices. In a specific embodiment the computing device may refer to at least one mobile robot 150 which may e.g. be equipped with one or more sensors for monitoring an environment for obtaining data to be used for the generation of the control signal as described. Alternatively, the mobile robot 150 as the computing device may communicate with the sensor system for obtaining the data. Still further, the computing device, such as the mobile robot, may be configured to generate the control signal based on some predetermined rules. The predetermined rules may e.g. define a position of the robot with respect to a time. For example, it may be defined that at certain instant of time in a morning, the mobile robot shall have a position in a vicinity of an entrance of a building due to a fact that passengers are entering the building at that time. At a second instant of time the robot shall have another position, such as it shall reside near a restaurant door at a lunch time since the possible users of the elevator system move around the restaurant area at that time. Naturally, the computing device is equipped with necessary hardware and software for implementing communication with other entities belonging to the elevator system, or at least with some of them.

Based on above the entity, such as the data center or the computing device being the mobile robot or an elevator controller, for example, may perform the generation of the control signal based on any data processed and/or analyzed by the respective entity. The data may e.g. be sensor data or any other data from which at least part of the position information is derivable either directly or indirectly. Moreover, the position information may be derived in a combined operation by a plurality of the mentioned entities.

Figure 3:
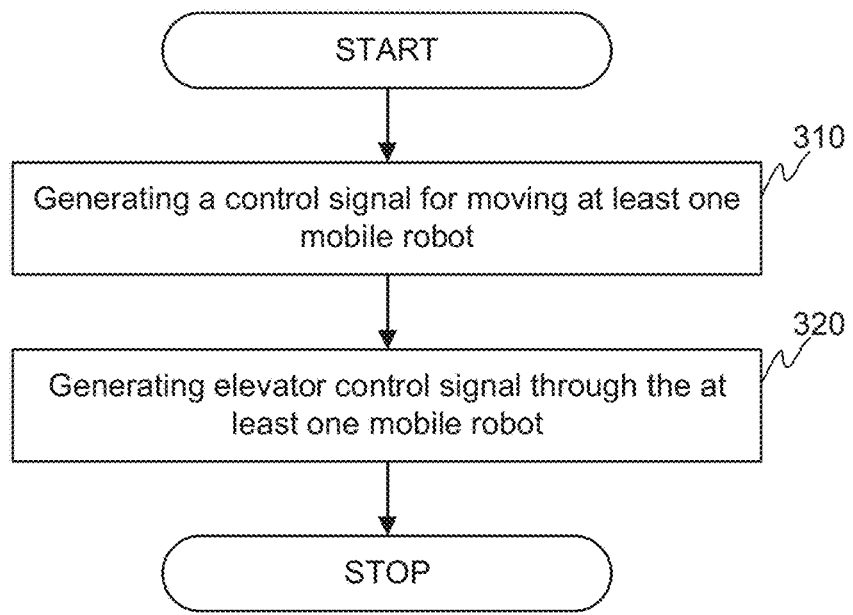
FIG. 3 schematically illustrates an example of a method according to an embodiment of the invention.

FIG. 3 schematically illustrates a principle of the method according to an embodiment. In step 310 the system may be configured to generate a control signal for moving at least one mobile robot 150 to a predetermined position. The generation of the control signal may refer to, but is not limited to, a data center generates the control signal, or indication of it, and transmits it either directly to the at least one mobile robot 150 or indirectly to the at least one mobile robot 150 through an elevator controller 110. The generation of the control signal may be initiated in response to a predetermined triggering event. The triggering event may be pre-defined e.g. through statistical analysis on e.g. user traffic within the location or any real-time monitoring arrangement, such as sensor system generating data representing user traffic in the location. The control signal causes the at least one mobile robot 150 to move to a predetermined position in the location.

In response to moving the at least one mobile robot 150 to a predetermined position one or more users may indicate with the mobile robot 150 that they are willing to use an elevator. The indication may e.g. be performed through a user interface of the at least one mobile robot 150. Alternatively, the at least mobile robot 150 may be configured to receive the indication by any other manner, e.g. by identifying the user in question, and through the identification to obtain data e.g. by communicating with the data center 140 on the assumable destination of the user. On the basis of the destination of the user, such as an office on $4^{th}$ floor, the mobile robot 150 may be configured to generate an elevator call without any specific user action. In response to a receipt of the elevator call 320 the elevator controller 110 may generate necessary control signals for reserving an elevator for the user in question. As discussed previously, the elevator call may be transmitted from the mobile robot 150 directly to the elevator controller 110, or indirectly to the elevator controller 110 through the data center 140. The method as schematically illustrated in FIG. 3 is a non-limiting example and the method may comprise further steps as described in the context of the description of FIG. 2, for example.

Figure 4:
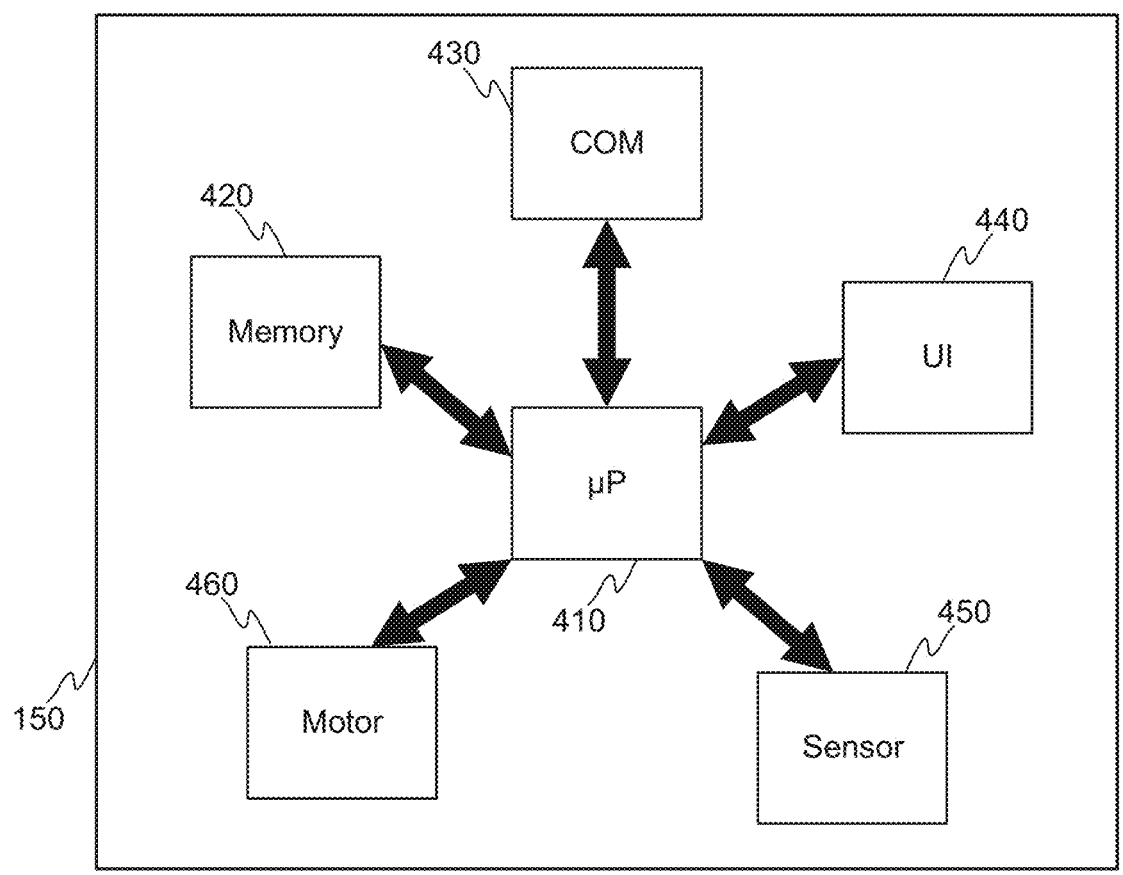
FIG. 4 schematically illustrates an example of a mobile robot according to an embodiment of the invention.

FIG. 4 schematically illustrates an example of a mobile robot 150 belonging to an elevator system. The mobile robot 150 may comprise at least the following entities: processing unit 410, memory unit 420, communication unit 430, user interface (UI) unit 440, sensor unit 450 and motor unit 460. The mentioned entities may comprise one or more operating units, e.g. one or more microprocessors or similar, one or more memories, one or more communication devices, such as modems, one or more user interface devices, one or more sensors and one or more motors. In addition to the mentioned entities the mobile robot 150 may comprise further devices and entities, such as batteries for storing energy to be used by the other entities. The entities belonging to the mobile robot 150 may be communicatively coupled to each other with e.g. a communication bus. The processing unit 410 may be configured to control the operation of the mobile robot 150 as well as communication with any external entity, such as with a data center 140, an elevator controller 110, other mobile robots, or other entities. The communication may be performed e.g. in a wireless manner. The users of the elevator system may provide input through the user interface unit 440 with the mobile robot 150 and the mobile robot may, under control of the processing unit 410, output information, such as prompting, to the user. The sensors may comprise any sensors by means of which the mobile robot 150 may obtain information on an environment, but also the sensor unit 450 may comprise sensors enabling positioning and/or navigation within the location. The processing unit 410 may also be configured to generate control signals to the motor unit 460 in order to make the mobile robot 150 to move. Moreover, the mobile robot 150 may comprise means enabling the robot to be mobile, such as the transport means as described earlier. The operation of the processing unit 410 may be achieved by executing portions of computer program code stored e.g. in the memory unit 420 for generating the control signals and, thus, causing the mobile robot 150 to operate in the manner as described. The memory unit 420 may also be used for storing obtained and received information together with any other data either permanently or temporarily. In some non-limiting embodiment the mobile robot 150 may be configured so that the user interface is disabled in response to a receipt of an input from a user in order to enable the robot to perform the task requested by the user. In this manner no other user may input other request when the first request is served by the mobile robot 150 in question.

Figure 5:
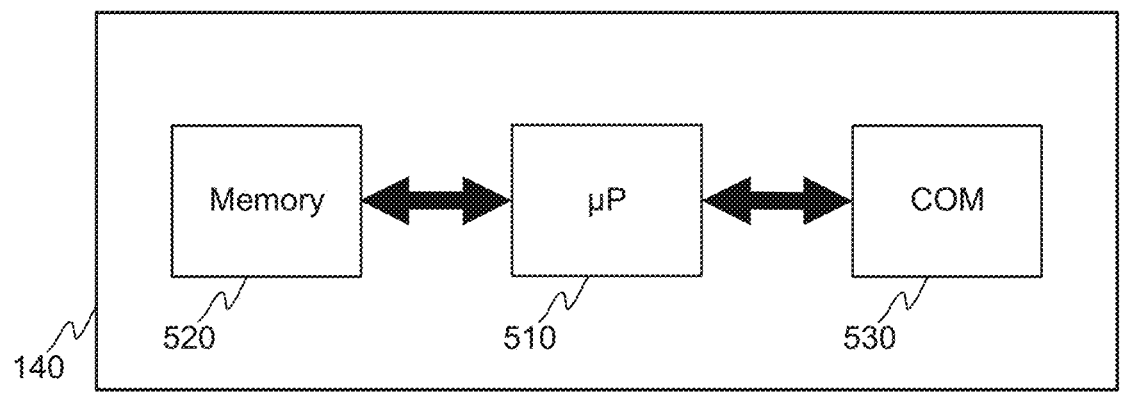
FIG. 5 schematically illustrates an example of a data center according to an embodiment of the invention.

FIG. 5, in turn, schematically illustrates an example of a data center 140 in which the data center 140 is implemented with a stand-alone server device. The data center 140 in this kind of implementation may comprise a processing unit 510 comprising one or more processors, a memory unit 520 comprising one or more memories and a communication unit 530 comprising one or more communication devices, such as modems. Advantageously, the memory unit 520 may store portions of computer program code and any other data, and the processing unit 510 may cause the data center 140 to operate as described by executing at least some portions of the computer program code stored in the memory unit 520. The data center 140 may be configured to communicate with any sensor system, mobile robot 150, elevator controller 110, or some combination of these, for example. Additionally, the data center 140 may comprise a timer implementation by means of which it may be configured to monitor duration of time.

Figure 6:
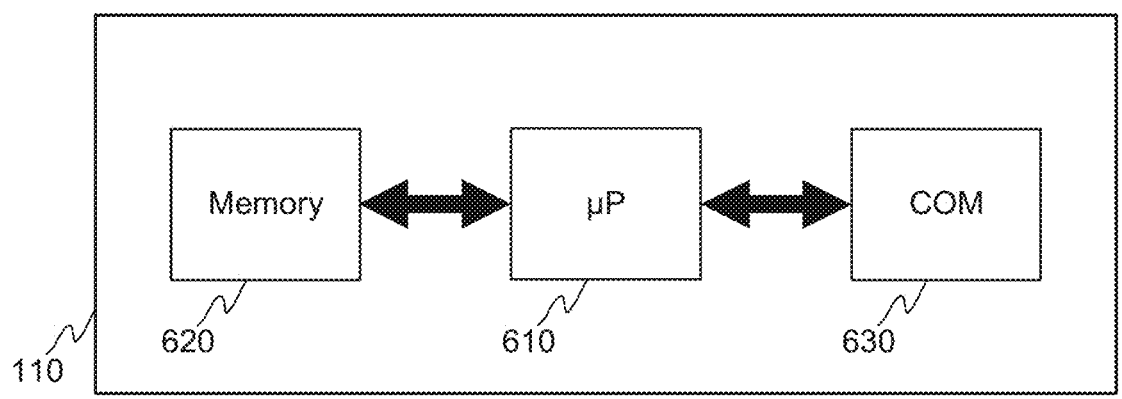
FIG. 6 schematically illustrates an example of an elevator controller according to an embodiment of the invention.

FIG. 6 schematically illustrates an example of an elevator controller 110 which is configured to communicate with at least one of the following: a data center 140, mobile robot 150. The elevator controller 110 may comprise a processing unit 610 comprising one or more processors, a memory unit 620 comprising one or more memories and a communication unit 630 comprising one or more communication devices, such as modems or other devices. Advantageously, the memory unit 620 may store portions of computer program code and any other data, and the processing unit 610 may cause the elevator controller 110 to operate as described by executing at least some portions of the computer program code stored in the memory unit 620.

As already mentioned at least some of the aspects of the present invention are described so that the generated control signal by the mobile robot is an elevator call signal. However, the generated control signal may be any other type, such as causing a control to elevator doors, or any other elevator related function. Some further non-limiting examples of the type of the generated control signal may be canceling the elevator call generated earlier or changing the elevator call. Moreover, the control signal may instruct the elevator to change its operational state, such as instructing the elevator to set to energy saving mode or instructing the elevator to enter or exit maintenance area. The type of the generated control signal may also relate to an external phenomenon, such as fire, earthquake or vandalism, i.e. disabling use of the elevator. In other words, the mobile robot provides an interface for a user, such as a passenger, to control an elevator in one way or another. The invention is especially applicable to be used for causing an elevator call.

The above described system provides advantages compared to prior art solutions in that the user experience may be improved and the efficiency of the elevator system may be optimized.

The specific examples provided in the description given above should not be construed as limiting the applicability and/or the interpretation of the appended claims. Lists and groups of examples provided in the description given above are not exhaustive unless otherwise explicitly stated.

What is claimed is:

1. An elevator system, comprising:
an elevator controller;
a data center; and
at least one mobile robot,
wherein the data center is configured to generate at least one first control signal based on user traffic information in a waiting area of an elevator and transmit the at least one first control signal to the at least one mobile robot to instruct the at least one mobile robot to move to a predetermined position in the waiting area of the elevator, and
wherein the at least one mobile robot is configured to generate at least one second control signal and transmit the at least one second control signal to the elevator controller, the at least one second control signal being configured to control the elevator in response to an interaction of the at least one mobile robot with at least one user in the predetermined position.

2. The elevator system of claim 1, wherein the at least one mobile robot comprises a user interface configured to interact with the at least one user.

3. The elevator system of claim 1, wherein the data center is configured to generate the at least one first control signal based on at least one of the following: real-time data obtained in a vicinity of the elevator, statistical data generated from data gathered in a vicinity of the elevator, data defining a predetermined rule for determining the predetermined position based on time.

4. The elevator system of claim 3, wherein the real-time data obtained in the vicinity of the elevator represents the user traffic information within the vicinity of the elevator.

5. The elevator system of claim 4, wherein the elevator system further comprises a sensor system configured to obtain the real-time data representing the user traffic information.

6. The elevator system of claim 3, wherein the data center is configured to generate the statistical data from data gathered in the vicinity of the elevator.

7. The elevator system of claim 6, wherein the statistical data represents user traffic information over a period of time in the vicinity of the elevator.

8. The elevator system of claim 1, wherein the at least one first control signal generated by the data center is transmitted to the at least one mobile robot by one of the following: the data center, through the elevator controller.

9. The elevator system of claim 1, wherein the data center is further configured to initiate a timer, in response to a generation of the at least one first control signal, for reserving the at least one mobile robot to serve for a duration of the timer.

10. The elevator system of claim 9, wherein the data center is configured to, in response to detection that no interaction is performed between the at least one mobile robot and the at least one user during the duration of the timer, generate a release signal to the at least one mobile robot for releasing the at least one mobile robot.

11. The elevator system of claim 1, further comprises a computing device, wherein the computing device is configured to generate at least one third control signal to the at least one mobile robot for instructing the at least one mobile robot to move to the predetermined position based on at least one of the following: real-time data obtained in a vicinity of the elevator, statistical data generated from data gathered in a vicinity of the elevator, data defining a predetermined rule for determining the predetermined position based on time.

12. The elevator system of claim 11, wherein the computing device is at least one of the following: an elevator controller, a dedicated device, at least another mobile robot.

13. The elevator system of claim 1 wherein the at least one second control signal generated by the at least one mobile robot to the elevator controller is at least one of the following: an elevator call, an elevator door control signal, a control signal for setting the elevator to a predetermined operational state.

14. A mobile robot for generating an elevator control signal, the mobile robot comprising:
at least one processor; and
at least one memory including computer program code, wherein the at least one memory and the computer program code configured to, with the at least one processor, cause the mobile robot to:
  receive, from a data center, at least one first control signal, wherein the at least one first control signal is generated based on user traffic information in a waiting area of an elevator and the at least one first control signal instructs the mobile robot to move to a predetermined position in the waiting area of the elevator, and
  generate at least one second control signal and transmit the at least one second control signal to an elevator controller, wherein the at least one second control signal is configured to control the elevator in response to an interaction of the mobile robot with at least one user in the predetermined position.

15. A method for generating an elevator control signal, the method comprises:
  generating, by a data center, at least one first control signal based on user traffic information in a waiting area of an elevator;
  transmitting, by the data center, the at least one first control signal to at least one mobile robot to instruct the at least one mobile robot to move to a predetermined position in the waiting area of the elevator;
  generating, by the at least one mobile robot, at least one second control signal; and
  transmitting, by the at least one mobile robot, the at least one second control signal to an elevator controller to control the elevator in response to an interaction of the at least one mobile robot with at least one user in the predetermined position.

16. The method of claim 15, wherein a generation of the at least one first control signal by the data center comprises:
  transmitting the at least one first control signal to the at least one mobile robot by at least one of the following: directly from the data center, indirectly through the elevator controller.

17. The method of claim 15, wherein the method further comprises:
  initiating a timer in the data center, in response to a generation of the at least one first control signal, for reserving the at least one mobile robot to serve for a duration of the timer.

18. The method of claim 17, wherein the method further comprises:
  generating, by the data center, in response to detection that no interaction is performed between the at least one mobile robot and the at least one user during the duration of the timer, a release signal to the at least one mobile robot for releasing the at least one mobile robot.

19. The method of claim 15, wherein the generating the at least one first control signal to instruct the at least one mobile robot to move to the predetermined position is based on at least one of the following: real-time data obtained in a vicinity of the elevator, statistical data generated from data gathered in a vicinity of the elevator, data defining a predetermined rule for determining the predetermined position based on time.

* * * * *